Sept. 8, 1931. B. G. BUSS 1,822,198
LOCKING CATCH FOR FOOT PEDALS
Filed July 24, 1930
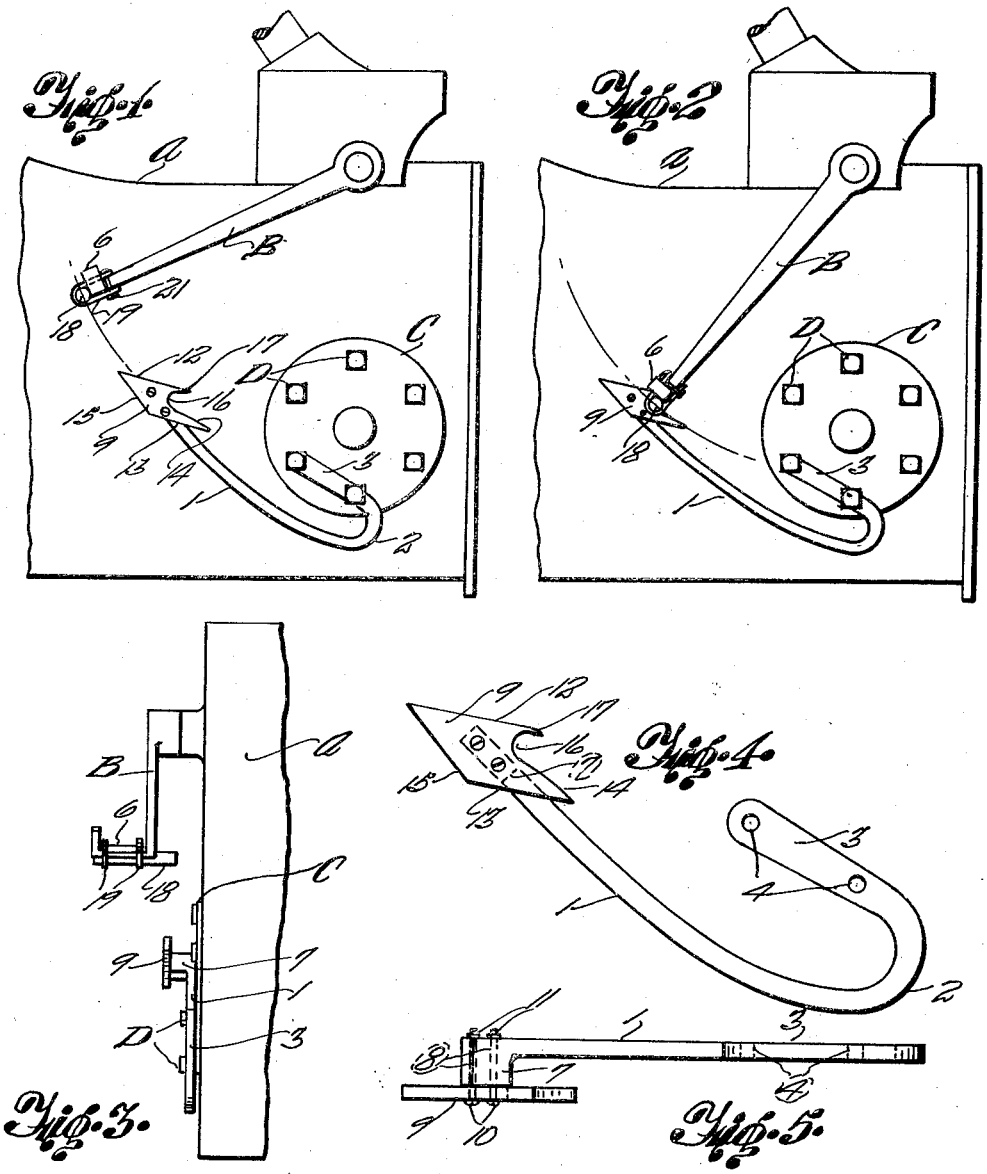
Inventor
Benhard G. Buss
By Adam E. Fisher
Attorney
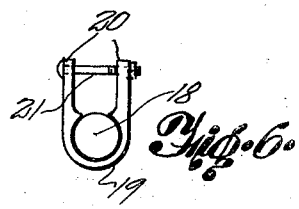

Patented Sept. 8, 1931

1,822,198

UNITED STATES PATENT OFFICE

BENHARD G. BUSS, OF GOLDEN, ILLINOIS

LOCKING CATCH FOR FOOT PEDALS

Application filed July 24, 1930. Serial No. 470,391.

This invention relates to a locking catch for foot pedals, operating levers and the like.

The main object of the invention is to provide a device of the above character which will automatically engage and lock a pedal or lever when the same is moved into the desired or locking position and which will then automatically disengage or release the pedal or lever upon a further slight movement of the same.

Another object is to provide a locking catch which may be readily mounted on the device carrying the pedal or lever to be locked and which may by slight modification of its mounting be adapted for locking gates, doors or other swinging and moving objects.

A further object is to provide a locking catch of the character set forth in a simple, efficient and durable form.

The foregoing and other objects together with means whereby the same may be carried into effect will best be understood from the following description of a preferred embodiment of the invention taken in connection with the accompanying drawings wherein:

Figure 1 is a side view of the clutch housing of a tractor and its associated clutch pedal, showing the invention applied thereto and showing the clutch pedal in its unlocked position.

Figure 2 is a view similar to Figure 1 but showing the clutch pedal in its locked position.

Figure 3 is a fragmentary front view of the clutch housing of the tractor showing the clutch pedal and locking catch in the position shown in Figure 1.

Figure 4 is an enlarged side elevation of the locking catch alone.

Figure 5 is a plan view thereof.

Figure 6 is a detail end view of the locking stud and one of its associated clamps.

Referring now more particularly to the drawings the reference character A designates the clutch housing of a tractor and B the clutch pedal for operation of the clutch therein. A circular mounting plate C is provided on the side of the housing A forward of and below the clutch pedal B and is held in place by the stud bolts D. The foregoing elements and their arrangement are conventional and no invention is claimed therefor. As is the usual practice the clutch pedal B must be pushed downward and forward toward the mounting plate C to disengage the clutch and must be held in this position when the tractor is used for driving other machinery through its power pulley (not shown). The clutch housing A and clutch pedal B serve only to illustrate the application of the invention and constitute the movable element to be locked in a certain desired position and the fixed element supporting the said movable element. It is understood that the invention may be applied to other machines or devices to hold levers, gates or other movable elements in position.

The invention comprises a supporting arm 1 of spring material bent back upon itself near one end at 2 to provide a mounting tang 3 which is provided with apertures 4 by means of which the arm 1 may be mounted on the plate C and held in place by two of the mounting bolts D thereof. The supporting arm 1 is thus mounted so that it extends rearwardly and upwardly adjacent the side of the clutch housing A inside the path taken by the foot rest or bar 6 on the clutch pedal B when the same is pushed downward and forward to operate the clutch. A shoulder or offset 7 is laterally extended from the free end of the arm 1 and is provided with spaced bolt receiving apertures 8. A locking plate 9 is provided and the same is preferably though not necessarily in the form of a parallelogram having two acute and two obtuse angles and is mounted on the outer face of the shoulder 7 on the arm 1 by bolts 10 projected through the apertures 8 and provided with nuts 11. The plate 9 is so positioned on the arm 1 that its upper and lower edges or faces 12 and 13 are disposed at an angle to the horizontal with their rear ends uppermost and the front and rear ends or faces 14 and 15 are inclined forwardly and downwardly to lie substantially parallel with the arc described by the foot bar 6 of the clutch pedal B. The front end or face 14 of the plate 9 is cut out to provide a notch 16 near the upper face 12, the said notch being extended angularly inward and upward into the plate 9 to provide an overhanging lip 17. A locking pin or stud 18 is secured to the foot bar 6 on the clutch pedal B by clamps 19 which are U-shaped as shown to receive the said pin 18 near their bight with their spaced arms 20 adapted for mounting over the said bar 6. Bolts 21 are passed through the ends of the arms 20 of the clamps 19 and serve to tighten the said arms on the foot bar 6 and so secure the clamps to the foot pedal B. The pin 18 extends inwardly from the clutch pedal a sufficient distance to engage the locking plate 9 when the clutch pedal B is pushed downward. The pin 18 however will not strike the supporting arm 1 since the plate 9 is offset therefrom by the shoulder 7 as will be understood from Figure 3 of the drawings.

In use the clutch pedal B is pushed downward and forward in the usual manner a sufficient distance to disengage the clutch. The pin 18 will thus strike the upper face 12 of the locking plate 9 and will move along this face and at the same time push the plate 9 and free end of the arm 1 downward. When the pin 18 reaches the end of the lip 17 the arm 1 will spring back upward somewhat and the pin 18 will then rest in the notch 16 to hold the clutch pedal B in the clutch releasing or disengaging position as shown in Figure 2. The locking plate 9 is of course so located that when the pin 18 enters the notch 16 the clutch pedal will be in the proper position to disengage the clutch. To release the pedal B the same is simply pushed further downward and forward until the pin 18 will clear the forward end of the plate 9 and the free end of the arm 1 will then swing back to its normal position. The clutch pedal B when released will then be swung back upward to its normal position by its usual operating spring (not shown), the pin 18 sliding along the lower and rear faces 13 and 15 of the plate 9 and causing the arm 1 to swing upward as will be understood. When the pin 18 clears the plate 9 the arm 1 will return to its normal position and the foregoing action will be again repeated when the clutch pedal is pushed downward. It will be evident that no operations are required for locking and releasing the clutch pedal other than the required initial downward movement of the pedal to release the clutch and then a slight further downward movement to release the pin 18 from the notch 16.

By slight modifications of the mounting of the locking plate 9 and locking pin 18 the invention may be used for locking levers a pedal of any kind as well as gates and other swinging or sliding elements. Also the pin 18 might be mounted on a spring instead of the locking plate 9 to operate in the same manner as will be understood.

While I have herein set forth a certain preferred embodiment of my invention it is understood that I may vary from the same in minor structural details so as best to construct a practical device for the purposes intended, not departing from the spirit of the invention and within the scope of the appended claim.

I claim:

In a device of the kind described, in combination with a fixed member and an adjacently mounted movable member adapted for travel in a curved path, a resilient arm secured at one end to the fixed member with the free end thereof directed towards the movable member and disposed laterally of the line of travel of the movable member, a lock pin upon the movable member and projecting laterally therefrom towards the extended axis of the fixed member, and a lock plate rigidly mounted upon the free end of the resilient fixed member, the said plate being so angularly shaped and recessed at its margins as to force the travel of the said pin in one direction over one edge of the said plate and its return over the opposite edge of the said plate.

In testimony whereof I affix my signature.

BENHARD G. BUSS.